March 4, 1941. E. E. LAKSO 2,234,051
MANUFACTURE OF BAGS
Original Filed April 28, 1936 3 Sheets-Sheet 1
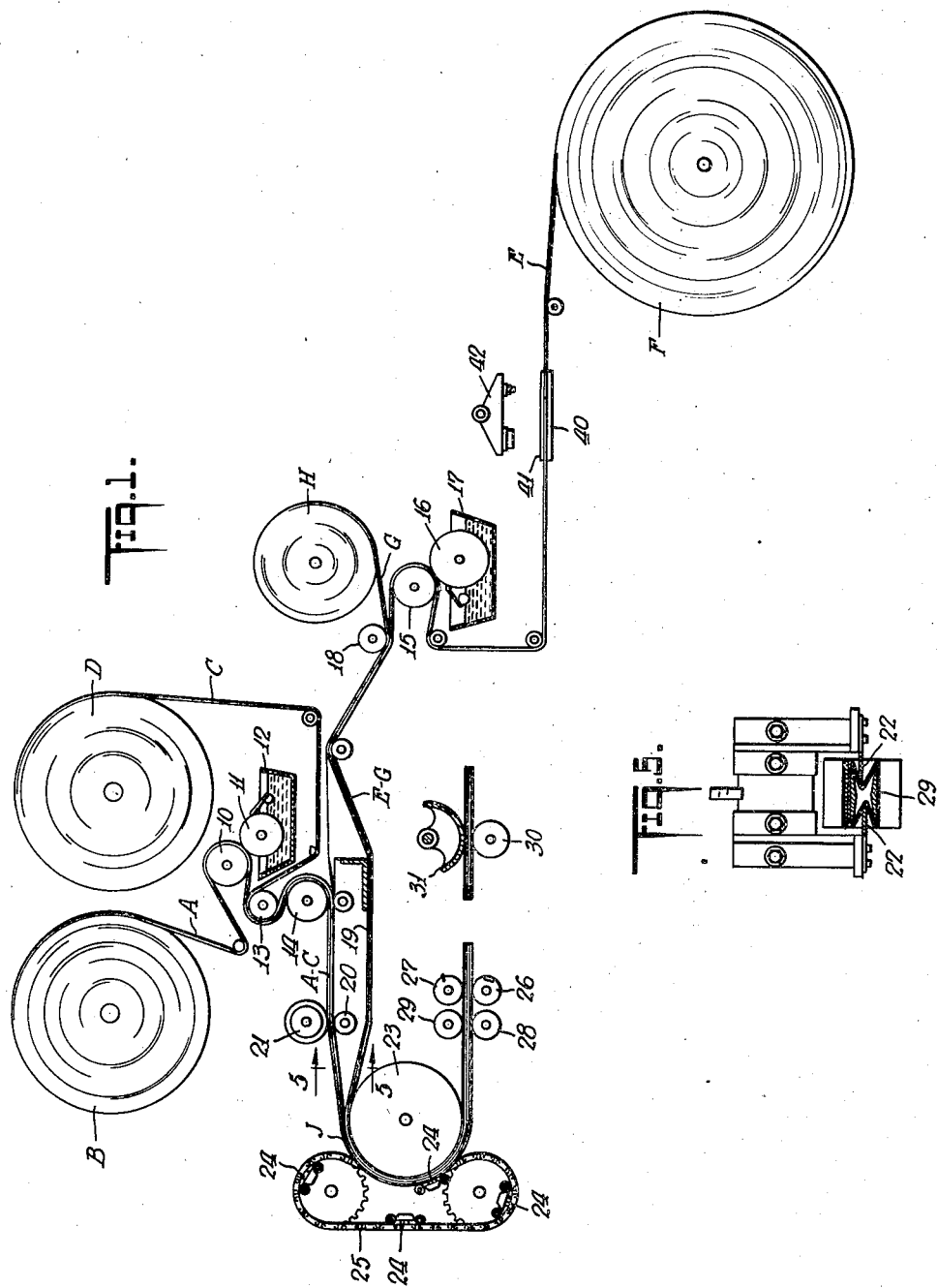
INVENTOR
*Eino E. Lakso*
BY
ATTORNEYS March 4, 1941.   E. E. LAKSO   2,234,051
MANUFACTURE OF BAGS
Original Filed April 28, 1936   3 Sheets-Sheet 2
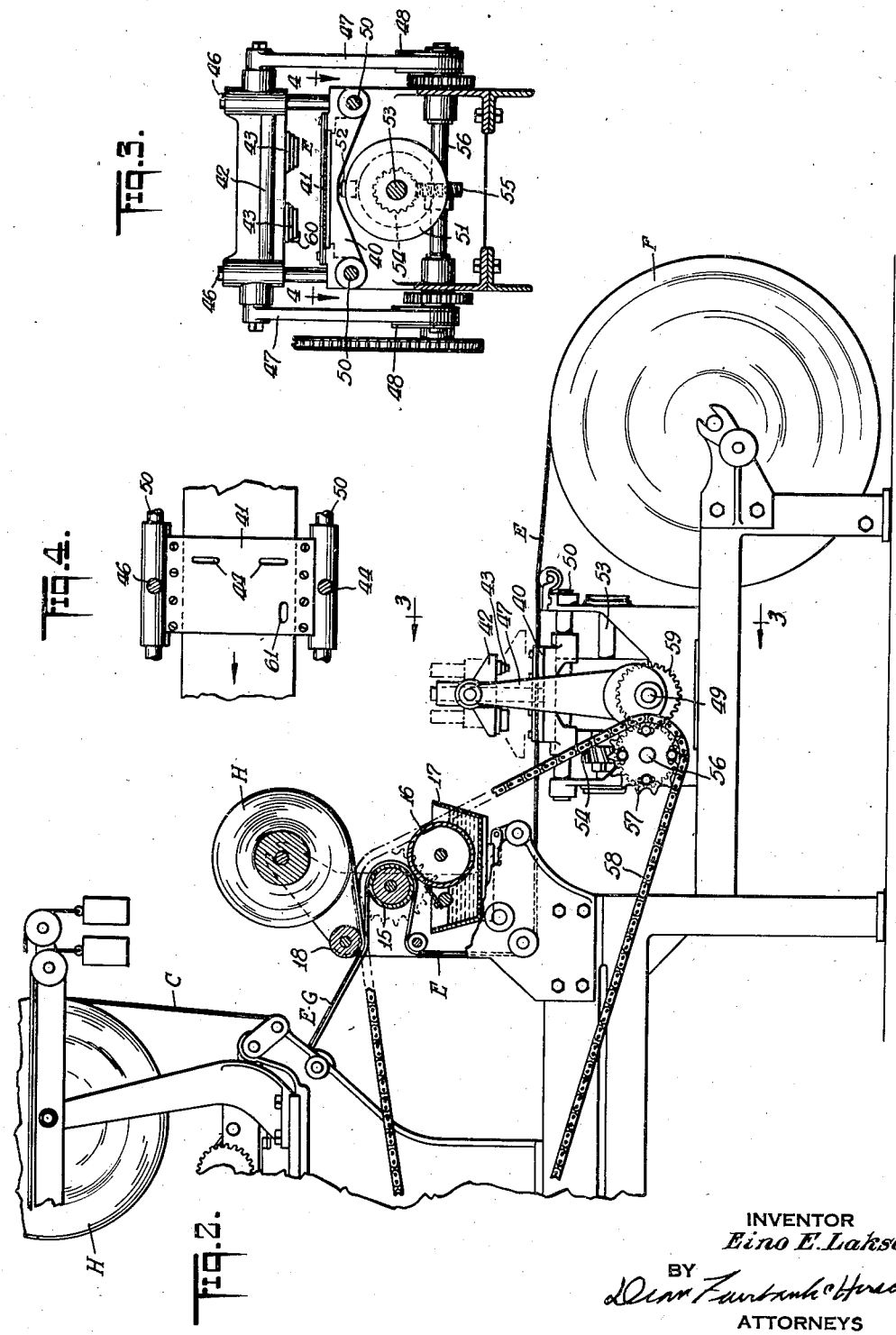
INVENTOR
Eino E. Lakso
BY
ATTORNEYS March 4, 1941. E. E. LAKSO 2,234,051
MANUFACTURE OF BAGS
Original Filed April 28, 1936   3 Sheets-Sheet 3
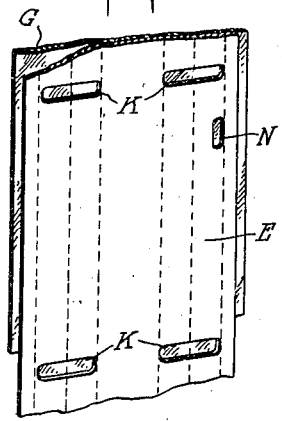
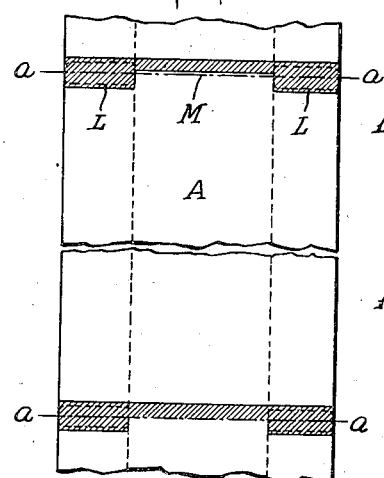
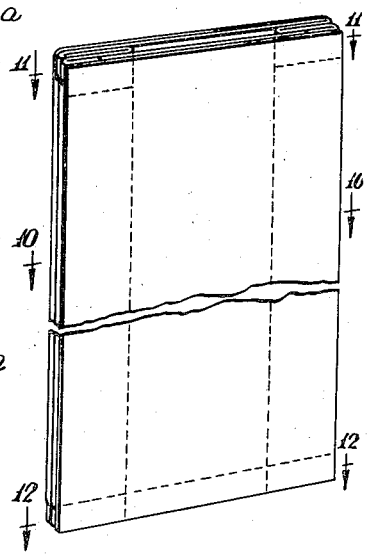
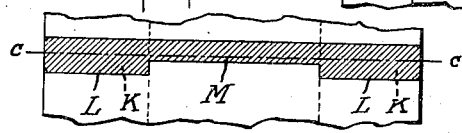
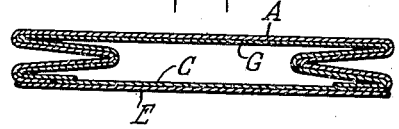
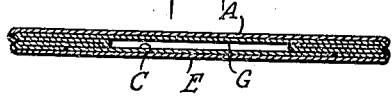
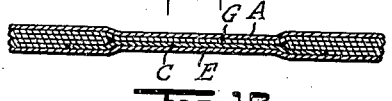
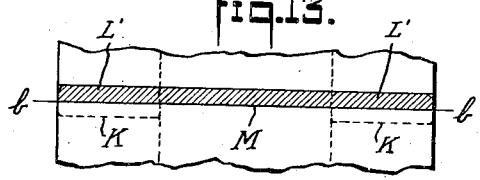
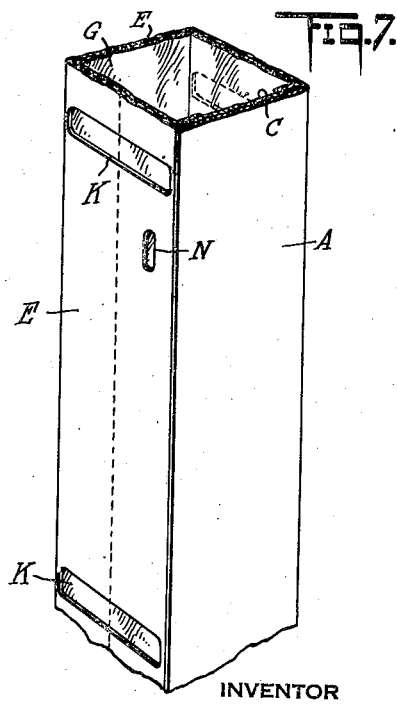
INVENTOR
Eino E. Lakso
BY
*Dean Fairbanks & Hirsch*
ATTORNEYS Patented Mar. 4, 1941

2,234,051

UNITED STATES PATENT OFFICE 2,234,051

MANUFACTURE OF BAGS

Eino E. Lakso, Fitchburg, Mass., assignor, by mesne assignments, to Owens-Illinois Glass Company, Toledo, Ohio, a corporation of Ohio Original application April 28, 1936, Serial No. 76,778. Divided and this application April 13, 1940, Serial No. 329,422

14 Claims. (Cl. 93—18)

This invention relates to the manufacture of bags of the type in which opposed side walls are infolded when the bag is collapsed, and in which such infolded walls are laminated, that is, made up of a plurality of layers or plies of sheet material.

The invention relates particularly to that type of bag in which the body or inner ply of the body walls is formed of thin flexible sheet material, impervious to moisture, whereby the bag may be used for shipment, storage and dispensing of liquids. Such material is preferably transparent, and is preferably of a type in which superposed layers may be directly sealed together or autogenously sealed or united together by the application of heat and pressure. One such material which is suitable for the purpose is a product sold under the name of "Pliofilm," which is a chlorinated rubber composition. Other materials include heat-sealable "Cellophane" and the like. In some cases the sealing together of superposed layers of the material may be by the use of an applied glue, cement or other adhesive.

The outer layer or lamination serves to protect and reinforce the inner layer, and may be of paper or other analogous material suitable for the purpose.

The bag may be formed by the continuous production of a tube from one or more webs of the sheet material sealed longitudinally by the required number of seams, dependent upon the number of webs employed. The tube with its opposite sides infolded may be collapsed, transversely sealed at spaced intervals along its length, and cut transversely into sections constituting the separate bags.

The cutting may be such in respect to the location of the transverse seals, and the transverse seals may be of such width or shape, that each of the produced bags may be merely sealed across the bottom with the opposite end entirely open, or each bag may be sealed not only across the bottom but part way across the top, for instance across the width of the infolded sections, leaving an opening through which the bag may be filled. The portion between the infolded sections may be lightly sealed, so that the collapsed bag will be hermetically sealed, but the filling opening may be readily formed by pulling apart the lightly sealed portions. After the bag is filled it may be sealed by forming a seam across the entire width, including the infolded sections and the portion therebetween, or if the bag during its manufacture is sealed across the infolded sections, the sealing after filling may be only between the opposite panels in the portion between the infolded sections.

So far as the present invention is concerned, the opposite panels between which side walls are infolded, may be a single ply of the impervious material, or may be multi-ply, with an outer layer of protecting or reinforcing material. The latter is preferable, in order that the inner ply may be protected from contact with the sealing apparatus, both during the formation of the bag and during the sealing after filling.

The present application is a division of my prior copending application, Serial No. 76,778, filed April 28, 1936, which resulted in Patent No. 2,206,965, issued July 9, 1940, and involves the means whereby the inner ply of the infolded sections may be directly sealed together and to the opposite panels, even though such infolded sections have outer laminations of non-heat-sealable protecting material. One embodiment of the present invention is illustrated in Figs. 26 to 29 of said application. The details of the mechanism illustrated in the other figures of the drawing of said application may be employed in carrying out of the present invention, or various other details and arrangements of parts may be employed.

In the accompanying drawings:

Fig. 1 is a diagrammatic showing, partly in section, of a machine in which my invention may be incorporated.

Fig. 2 is a side elevation, partly in section, of a portion of the machine shown in Fig. 1, and illustrating one embodiment of the present invention in somewhat greater detail.

Fig. 3 is a vertical section on the line 3—3 of Fig. 2.

Fig. 4 is a horizontal section on the line 4—4 of Fig. 3.

Fig. 5 is a sectional detail on the line 5—5 of Fig. 1, but showing some of the parts in greater detail.

Fig. 6 is a face view of one of the laminated webs.

Fig. 7 is a perspective view of the tube after the longitudinal seams are formed and before the collapsing and forming of the transverse seams.

Fig. 8 is a face view of a portion of the collapsed tube which is to be cut in sections to make the bags.

Fig. 9 is a perspective view of one of the bags in collapsed condition.

Figs. 10, 11 and 12 are transverse sections the lines 10—10, 11—11 and 12—12 respectively of Fig. 8, and Figs. 13 and 14 are views similar to a portion of Fig. 8, but showing different shapes of sealed areas or locations of transverse cutting lines.

In the present embodiment of the invention two webs are employed, one which is laminated and forms one panel of the bag, and the other of which is also laminated and forms both the opposite panel and the infolded side walls, so that there are two longitudinal seams adjacent to opposite edges of the first mentioned panel. So far as the present invention is concerned, the tube may be formed of a single web to form both panels and the infolded sides, and in which at least the portion forming the infolded sides is laminated, although the entire web may be laminated.

In the specific form illustrated, a sheet A of paper or other reinforcing or protecting material is delivered from a roll B, and a sheet C of the impervious material, hereinafter for convenience referred to as "Pliofilm" is delivered from a roll D. One of these sheets, for instance the sheet A, passes over a roller 10 and receives a coating of adhesive from a transfer roller 11 in a glue pot 12, and the two sheets A and C are brought together while passing around a roller 13, and then pass around a roller 14 to the tube forming mechanism. These parts may be constructed and arranged as shown in my prior application above referred to, but may be of any other desired construction. In this particular machine the laminated web A—C forms merely one panel of the bag or one side of the tube, rectangular in cross-section.

For forming the remaining portion of the tube a sheet E of paper or other reinforcing and protecting material is delivered from a roller F, passed through the perforating mechanism hereinafter described more in detail, and thence around a roller 15 where it receives a coating of adhesive from a transfer roller 16 in a glue pot 17. A sheet G of Pliofilm is delivered from a roll H, and this sheet is brought together with the paper sheet E as the two pass over a roller 18. The laminated sheet E—G is of greater width than the laminated sheet A—C, and the tube former bends this web to form both a side panel and the infolded sides of the tube.

The tube former may be any suitable type of mandrel 19 which may be rectangular in cross-section, with suitable guiding parts (not shown), and with means for sealing the opposite edges of one web to the opposite edges of the other on the top surface of the tube former. Such sealing means may include a pair of rollers 20, 21, one of the rollers being housed within the mandrel 19. One of the rollers, for instance the roller 21, may have merely a pair of peripheral flanges so located as to register with the overlapping edges of the two webs, and may be heated, and the other roller, 20, may if desired have a resilient face. If the bag has two longitudinal seams, the sheet E may be slightly narrower than the sheet G, and the sheet C may be slightly narrower than the sheet A, so that the sheets G and C may be overlapped and sealed at the seams, and the sheets A and E may be also sealed together.

Beyond the means for forming the longitudinal seam or seams, the mandrel progressively decreases in thickness, and tucker members 22 extend into opposite sides, as shown in Fig. 5, to infold opposite walls of the tube. Beyond the tube former the tube is substantially if not completely collapsed, spaced areas along the length thereof are provided with transverse seals or seams, and the tube is cut into sections to form the separate bags.

Any suitable mechanism may be provided for performing this function. Merely as an illustration, the collapsed tube J passes around a roller 23 against which the tube is pressed at spaced points by heating means, to form the transverse seams. As shown, there are a plurality of heat sealing members 24 mounted on an endless conveyor 25, a portion of which follows the periphery of the roller or drum 23. The spacing between these sealing members is equal to the length of the bag, and each forms a seal across the width of the collapsed tube to connect together the superposed layers of the tube to form the bottom of each bag, and if desired a sealed portion of the top of the bag.

These sealing members apply heat and pressure to the tube. The tube then passes through a suitable transverse cutting mechanism which includes a pair of rollers 26, 27, one of which may be provided with a cutting blade, and the tube may be fed to these rollers by a pair of feed rolls 28, 29, which insure uniform speed of travel and therefore uniform length of bags. The completed bags may be delivered from the machine and advanced at higher speed than the tube, by delivery mechanism 30, 31.

It will be understood that the details of all of these parts which are not illustrated may be the same as in my application 76,778 above referred to, or may be of any other desired type.

In order to permit the direct sealing together of the inner lamination of the infolded sections, which are in the main covered and protected by an outer non-heat-sealable lamination, there is provided means for forming apertures or slots in the sheet or web E prior to the uniting of that web with the Pliofilm web G. The details of a mechanism which may be employed for this purpose are shown in Figs. 2, 3 and 4.

The web E of paper is passed over a platform 40, and preferably beneath a plate 41 acting as a stripper plate for the perforating mechanism. Above the stripper plate is a die carrier 42 having die members 43 on the under side adapted to pass through slots 44 in the stripper plate 41 and into corresponding female die openings in the bed plate or platform 40. The die carrier 42 is vertically guided on columns 46 and is reciprocated with an up and down motion by cranks 47 engaging eccentrics 48 mounted on stub shafts 49 beneath the platform 40.

As the web E is continuously advancing through the perforating mechanism, means are provided whereby the perforating mechanism has a movement back and forth in the direction of travel of the web. As shown, the platform or templet 40 and the stripper plate 41 are mounted on horizontal guide rods 50 on opposite sides of and parallel to the web E. Beneath the templet there is mounted a cam roller 51 with a peripheral groove receiving a roller 52 projecting down from the templet.

The shape of the groove in the cam roller 51 is such that for each complete revolution the templet is moved along with the web E, and at the same speed, for a limited distance during the perforating operation. After the dies have been raised out of the paper the templet is moved in the opposite direction. The range of such horizontal movement of the die carrier is indicated in dotted lines in Fig. 2. The cam roller 51 may be mounted on a shaft 53 having a spiral gear 54 meshing with a spiral gear 55 on a shaft 56. The raising and lowering of the die members is kept in proper timed relationship to the back and forth horizontal movement of the perforating mechanism, and in timed relationship to the other parts of the machine. For this purpose there may be provided a shaft 56 having a sprocket wheel 57 receiving power through a chain 58 from the main drive of the machine, and the shaft 56 may have gears meshing with the gears 59 on the stub shafts 49 carrying the eccentrics 48.

From a comparison of Figs. 6 and 7 it will be seen that the laminated sheet E—G is folded to form three sides of the tube, and that the slots K which are formed in the outer layer E are of a length substantially equal to the width of two sides of the tube. The tube shown in Fig. 7 is collapsed by the infolding of the two slotted sides, so that the fold at the middle of the infolded sides comes intermediate of the ends of the slots.

The mechanism for forming the transverse seams, and including the elements 24 shown in Fig. 1, have faces which may form sealed areas as shown by shading in Fig. 8. The sealing includes portions L in which the inner layers of the infolded sides are sealed together through the slots K, and at the same time are sealed to the inner layers of the opposite panels. It also includes an area M in which the opposite panels are directly sealed together between the inner edges of the infolded portions.

If it is desired to form bags which are closed at the bottom and are sealed only across the infolded sections to leave the mouth partially open, the tube may be cut transversely on the lines a—a, which extend across the sealed areas L but are slightly spaced from the area M, as shown in Fig. 8.

If it is desired to leave the mouth of the bag entirely open, the tube may be cut on the line b—b, which is intermediate of the edges of the slots, as shown in Fig. 13, and the area M may be of the same width as the areas L', and of only about one-half of the width of the slots K. Thus the bag when filled may be sealed at the top across the other portion of the slots and across the area between.

If it is desired to very lightly seal the mouth of the bag, the tube may be cut transversely on the line c—c of Fig. 14, where it is within but closely adjacent to the side of the sealed area M, and the bottom of the bag will be firmly sealed and the top will have firm sealing in the areas L corresponding to the slots K, and will have a very narrow sealing strip across the mouth of the bag.

In some cases it is desirable to provide one of the walls of the bag with a window opening whereby the contents may be seen through the inner layer of the wall where said inner layer is of transparent material. To provide such window opening N as shown in Fig. 7, the die carrier 43 may be provided with an additional die member 60 operating through an aperture 61 in the stripper plate 41, and a corresponding female die opening in the templet or platform 40.

A bag which may be formed by means of my improved machine and method is disclosed and claimed in copending application Serial No. 74,-424, filed April 15, 1936. The bag there shown differs from the one herein illustrated in that it is made of a single laminated web and with a single longitudinal seam, instead of from two webs with two seams as shown herein, but obviously the machine may be designed to make the tube from as many webs as may be desired.

Having thus described my invention, what I claim as new and desire to secure by Letters Patent is:

1. Apparatus for forming a laminated bag, comprising means for superposing a web of impervious sheet material and a web of reinforcing sheet material, the latter having transverse slots at spaced intervals along the length thereof, means for forming the superposed webs into a tube with the slotted web forming the exterior lamination of the tube and with said slots covered by the inner lamination, means for collapsing the tube by infolding opposite sides between parallel face panels and with said slots extending transversely of said infolded sides, means for sealing together the infolded sides through said slots and sealing said infolded sides to said panels, and means for thereafter cutting said tube into sections along transverse lines registering with said slots.

2. Apparatus for forming a laminated bag, comprising means for superposing a web of impervious sheet material and a web of reinforcing sheet material, the latter having transverse slots at spaced intervals along the length thereof, means for forming the superposed webs into a tube with the slotted web forming the exterior lamination of the tube and with said slots covered by the inner lamination, means for collapsing the tube by infolding opposite sides between parallel face panels, the infolded portions each extending less than half way across said panels, and with said apertures extending transversely of said infolded sides, means for sealing together the infolded sides through said apertures and sealing said infolded sides to said panels, and means disposed beyond said sealing means for cutting said tube into sections along transverse lines registering with said slots.

3. Apparatus for forming a laminated bag, comprising means for superposing a web of impervious sheet material and a web of reinforcing sheet material, the latter having transverse slots at spaced intervals along the length thereof, means for forming the superposed webs into a tube with the slotted web forming the exterior lamination of the tube and with said slots covered by the inner lamination, means for collapsing the tube by infolding opposite sides between parallel face panels, the infolded portions each extending less than half way across said panels and with said apertures extending transversely of said infolded sides, means for sealing the opposite sides of said infolded portions together and to said panels in the areas of said apertures, and sealing said panels together along transverse strips between said apertures and means disposed beyond said sealing means for cutting said tube into sections along lines registering with said sealed areas.

4. Apparatus for forming a laminated bag, comprising means for superposing a web of impervious sheet material and a web of reinforcing sheet material, the latter having transverse slots at spaced intervals along the length thereof, means for forming the superposed webs into a tube with the slotted web forming the exterior lamination of the tube and with said slots covered by the inner lamination, means for collapsing the tube by infolding opposite sides between parallel face panels, the infolded portions each extending less than half way across said panels and with said apertures extending transversely of said infolded sides, means for sealing the opposite sides of said infolded portions together and to said panels in the areas of said apertures, and sealing said panels together along transverse strips between said apertures, the part of the sealing means acting between the infolded portions being of less width than the part of the sealing means acting through said apertures, and means for cutting the tube transversely into sections across the sealed areas to form bags closed at the bottom and partially closed at the top.

5. Bag forming apparatus including means for progressively advancing a web of heat-sealable material, means for progressively advancing a web of protective material, means for forming transverse slots in the web of protective material at intervals lengthwise thereof, means for superposing said webs to produce a laminated web, means for shaping said laminated web to tubular form and sealing the marginal edges together with the slotted web forming the exterior lamination of the tube and with said slots covered by the inner lamination, means to collapse the tube and infold opposite sides thereof to form infolded pleats extending longitudinally of the tube between opposed panels, said slots being so positioned that they are infolded with and extend transversely of the infolded pleat, means extending transversely of the path of movement of the collapsed tube for applying heat and pressure to the tube in the successive areas defined by said slots, and means disposed beyond said last mentioned means for severing the tube into sections constituting individual bags.

6. Bag forming apparatus including means for progressively advancing and superposing two webs, one of protective material having transverse slots therein at intervals along the length thereof, and the other of heat-sealable material, to form a laminated web, means for shaping the laminated web to tubular form and sealing the marginal edges together, means to collapse the tube and infold opposite sides thereof to form infolded pleats extending longitudinally of the tube, said slots being so positioned that they are infolded with and extend transversely of the infolded pleat, means for applying heat and pressure to the tube at the successive areas extending transversely of the tube at said slots to seal together opposite sides of the infolded pleats, and means disposed beyond said last mentioned means for severing the tube into successive sections along transverse lines corresponding to said slots to form individual bags.

7. Apparatus for making bags of flexible laminated material, said apparatus including means for progressively advancing laminated sheet material including heat-sealable material and protective material, the last mentioned material having transverse slots therein at intervals along the length thereof corresponding to the length of the bags, and said slots being covered by the heat-sealable material, means for progressively shaping said sheet material to tubular form with the slotted protecting material on the outside, means for sealing longitudinal edges together to form a tube, means for infolding the sides of the tube to form pleats extending lengthwise thereof and for collapsing the tube, said transverse slots being so positioned as to be included in and extend transversely of the pleats, means for heat-sealing all of the heat-sealable layers together at the area of said slots, and means disposed beyond said heat-sealing means for severing the tube along lines adjacent to said seals to form individual bags.

8. Bag forming apparatus including means for progressively advancing a web of heat-sealable material, means for progressively advancing a web of protective material, means for forming pairs of transverse slots in the web of protective material at intervals lengthwise thereof and adjacent to opposite edges, means for superposing one of said webs over the other, means for bending the laminated web thus produced to channel form and sealing the marginal edges to the edges of a second laminated web to form a tube with the slotted protecting material on the outside, means to collapse the tube and infold opposite side walls of the channel shaped web to form infolded pleats extending longitudinally of the tube between opposed panels, said slots being so positioned that they are infolded with and extend transversely of the infolded pleats, means extending transversely of the path of movement of the collapsed tube for directly sealing the panels and pleats together in the areas of said slots, and means for severing the tube transversely into sections along areas registering with said slots.

9. Bag forming apparatus including means for progressively advancing a web of heat-sealable material, means for progressively advancing a web of protective material, means for forming transverse slots in the web of protective material at intervals lengthwise thereof, means for superposing one of said webs over the other, means for shaping the laminated web thus produced to tubular form and sealing the marginal edges together, means to collapse the tube and infold opposite sides thereof to form infolded pleats extending longitudinally of the tube, said slots being so positioned that they are infolded with and extend transversely of the infolded pleat, means for applying heat and pressure to the tube at areas extending transversely thereof along the tube at said slots, and means for severing the tube to form individual bags.

10. Apparatus for making bags of flexible laminated material, said apparatus including means for progressively advancing a web of heat-sealable material and a web of protective material, means for successively cutting transverse slots in said web of protective material at intervals lengthwise thereof corresponding to the length of the bags, means for bringing said slotted web into superposed relation to the first named web, means for progressively shaping the laminated web thus produced to tubular form, means for sealing the longitudinal edges together to complete the tube, means for infolding the sides of the tube to form pleats extending lengthwise thereof and for collapsing the tube, said transverse slots being positioned to be included in and extend transversely of the pleats, means for heat-sealing the tube transversely along said slots, and means for severing the tube along the transverse seals to form individual bags.

11. The method of forming a bag which includes forming openings in the non-heat-sealable sheet material, assembling said sheet material with heat-sealable sheet material covering said openings, forming a tube of the superposed sheets, the first mentioned material being on the outside, infolding opposite sides of the tube to form longitudinally extending pleats between opposite panels with said openings extending transversely of the infolded portions, sealing said panels and said infolded portions together through said openings and across said panels, and cutting said tube transversely adjacent to the sealed areas.

12. The method of forming a bag which includes forming a tube from sheet material having an inner heat-fusible layer and an outer non-heat-fusible protecting layer, said outer layer having transverse slots across relatively narrow areas, infolding opposite sides of said tube to collapse the tube and present opposed panels separated by the infolded portions, sealing the infolded portions and the panels together along said relatively narrow areas transverse of the panels and by the application of heat and pressure applied through the protecting layer, the sealing together of the inner layer along said areas of the infolded portions being through said slots of said outer layer, and cutting said tube into sections along transverse lines adjacent to the sealed areas.

13. The method of forming a bag which includes forming a collapsed tube with opposite panels and infolded connecting side walls, said tube being formed of laminated sheet material including an inner sheet of heat-sealable material and an outer sheet of non-fusible reinforcing and protecting material, said outer sheet having slots extending transversely of the infolded side walls, and sealing said infolded walls together and to said panels by heat and pressure applied through one of said panels in the areas registering with said slots and across the panel.

14. The method of forming a bag which includes forming a collapsed tube with opposite panels and infolded connecting side walls, said tube being formed of laminated sheet material including an inner sheet of heat-sealable material and an outer sheet of non-fusible reinforcing and protecting material, said outer sheet having a plurality of pairs of slots spaced apart lengthwise of said tube and extending transversely of the infolded side walls, sealing all of the superposed layers of said heat-sealable material together across the width of one of said panels and intersecting one pair of slots, and cutting the tube transversely into sections along lines adjacent to said last mentioned slots to form bags, said bags being sealable at the opposite ends by the application of heat and pressure to one of the panels and across a line transversely of the panel and intersecting another pair of said slots.

EINO E. LAKSO.